United States Patent
Semler et al.

(10) Patent No.: US 6,675,315 B1
(45) Date of Patent: Jan. 6, 2004

(54) DIAGNOSING CRASHES IN DISTRIBUTED COMPUTING SYSTEMS

(75) Inventors: Daniel Semler, Menlo Park, CA (US); Yuriy S. Granat, Castro Valley, CA (US); Alok Srivastava, Santa Clara, CA (US); Ivan Tinlung Lam, Santa Clara, CA (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 09/565,787

(22) Filed: May 5, 2000

(51) Int. Cl.[7] .................................................. G06F 11/00
(52) U.S. Cl. .................... 714/4; 714/2; 714/3
(58) Field of Search ............................ 714/4, 2, 3, 10, 714/11, 12, 13; 712/39

(56) References Cited

U.S. PATENT DOCUMENTS

| | | | |
|---|---|---|---|
| 4,965,717 A | * 10/1990 | Cutts et al. | 714/12 |
| 5,751,942 A | * 5/1998 | Christensen et al. | 714/38 |
| 5,752,062 A | * 5/1998 | Gover et al. | 714/37 |
| 5,884,018 A | * 3/1999 | Jardine et al. | 714/4 |
| 5,928,368 A | 7/1999 | Jardine et al. | |
| 6,002,851 A | * 12/1999 | Basavaiah et al. | 714/4 |
| 6,151,689 A | * 11/2000 | Garcia et al. | 714/49 |

* cited by examiner

*Primary Examiner*—Nadeem Iqbal
*Assistant Examiner*—Timothy M. Bonura

(57) ABSTRACT

Mechanisms are provided for preserving data wherein one or more nodes in a distributed computing system experiences an error. In one embodiment, when an error occurs, an error event is identified. Based on this error event, a set of identified execution units is suspended and a set of identified data is collected. All suspended execution units are then released, i.e., allowed to continue execution at the point where the units were suspended. The data collected during suspension is then used to diagnose the cause of the error.

20 Claims, 4 Drawing Sheets

| CRASH EVENTS | UNITS TO BE SUSPENDED | DATA TO BE DUMPED |
|---|---|---|
| CRASH EVENT #1 | NODE 110-1, P1, P2 | PROCESS STATE |
| CRASH EVENT #2 | NODE 110-3, P3, P4 | SYSTEM STATE |
| . . . | . . . | . . . |
| CRASH EVENT #K | . . . | . . . |

/200

DIAGNOSING CRASHES IN DISTRIBUTED COMPUTING SYSTEMS

FIELD OF THE INVENTION

The present invention relates generally to distributed computing systems and, more specifically, to preserving data for diagnosing crashes in such systems.

BACKGROUND OF THE INVENTION

A crash in a computer system is a serious failure in which the computer stops working or a computer program aborts unexpectedly. A crash signifies either a hardware or a software malfunction. Exemplary causes of system crashes include memory access violation, bad pointers, or violation of assertion conditions in a program. Effectively diagnosing a crash is complex, and this complexity is exacerbated in distributed systems in which multiple nodes participate in an operation. This is because, in distributed systems, multiple nodes interface with each other, and a crash on a particular node does not necessarily mean that the cause of the crash originates from that node. The cause of the crash may be, for example, a message that was transmitted to the crashed node and that subsequently causes the crash. In various cases, the sequence of events leading to the crash may spread across numerous nodes. Further, because only one node in the multiple nodes crashes, the non-crashed nodes continue to function and thus change the overall state of the system, which makes it more difficult to identify causes of the crash.

Currently, when a system crashes, diagnostic programs typically perform a "core dump," which provides information to be analyzed as to the cause of the crash. Such information reflects the system state of the crashed node at the time of crash, addresses of memories, program counters, etc. However, because other nodes interfacing with the crashed node are still functioning, the state of the non-crashed nodes continues to change. Having data from the crashed node is useful, but, in many cases, is not sufficient for identifying the cause of the crash.

Based on the foregoing, it is clearly desirable to provide better techniques for diagnosing crashes in systems in which multiple nodes participate in operations.

SUMMARY OF THE INVENTION

Mechanisms are provided for preserving state information in response to errors that occur in operations in which multiple nodes are participating. In one embodiment, when an error occurs, one or more execution units are suspended. These execution units may be on the node on which the error occurred (the "error node") and/or on other non-error nodes. In this context, the term "execution unit" refers to a program that executes a particular task. State information is collected from both the suspended execution units and the error node in which the error occurred. All suspended execution units are then released, i.e., allowed to continue execution at the point where the units were suspended. The data collected during suspension is then used for diagnosing the error.

According to one embodiment, the type of error event dictates which execution units to be suspended and the type of information to be collected from the execution units that have been suspended.

In accordance with various embodiments of the invention, suspension of execution units provides a window of opportunity to collect all relevant information necessary for identifying causes of a crash. Further, the collected data are analyzed "off-line," without affecting usage of the involved system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Mechanisms are provided for preserving state information in a distributed computing system when one of the nodes in the system experiences an error during an operation that involves one or more other nodes. The preserved data is then used for identifying causes of the crash. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

THE DISTRIBUTED COMPUTING SYSTEM

Figure 1:
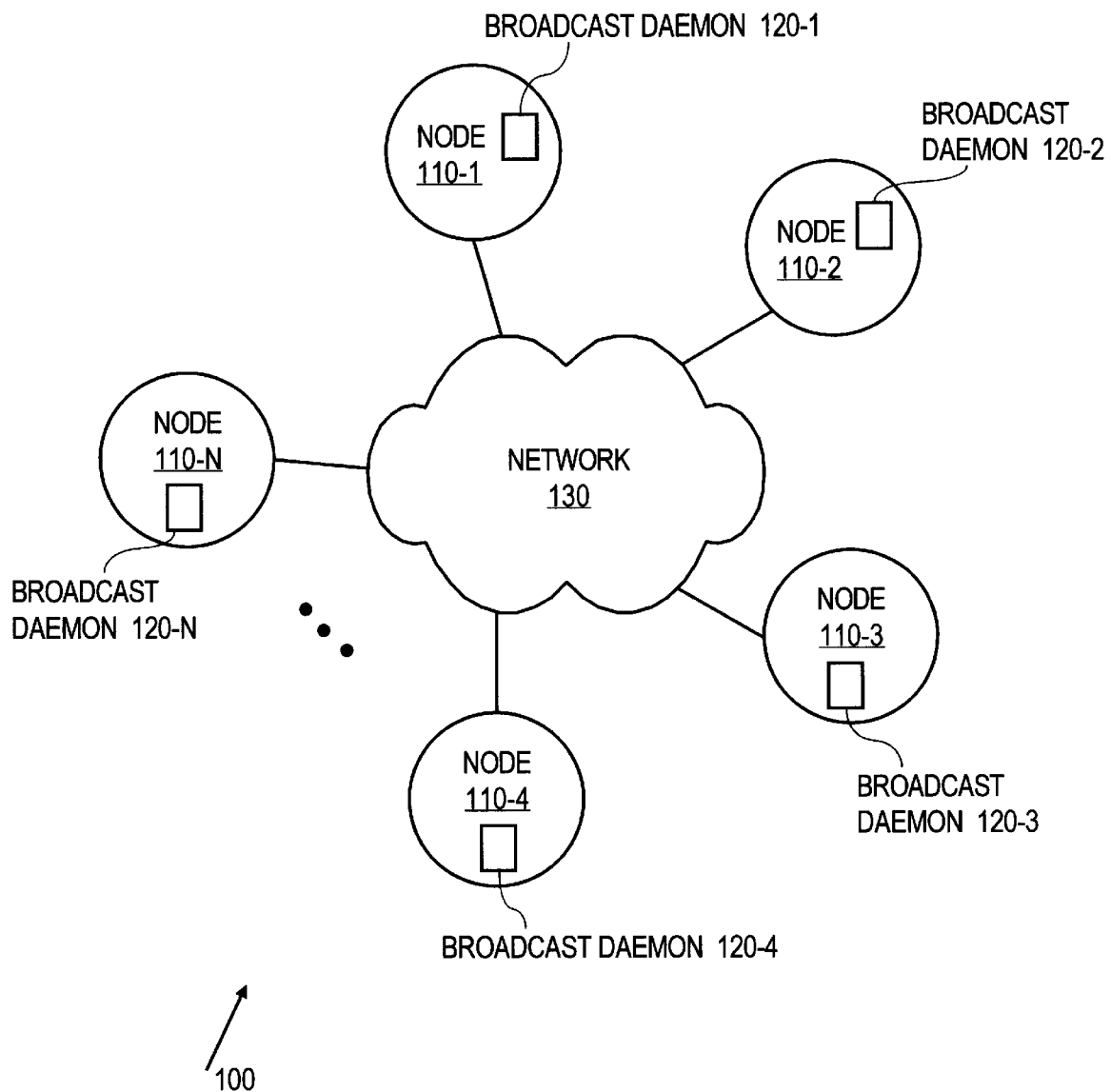
FIG. 1 shows a distributed computing system that can utilize embodiments of the invention.

FIG. 1 shows a distributed computing system 100 in accordance with one embodiment of the invention. System 100 includes a plurality of nodes 110 wherein each node 110, via network 130, interfaces with other nodes 110 of system 100. A node 110 is one or more processors that have access to a memory area. Typical nodes include, for example, individual workstations on a network and individual processors within a multi-processing machine. A node runs one or more processes, which may be referred to as executing programs or execution units. Because a node may be variably implemented with different execution units, the present invention is not limited to any type of node or execution units. A node 110 within which an error occurs shall be referred to herein as the error node 110E.

In one embodiment, each node 110 has a corresponding broadcast daemon 120. When an error occurs, broadcast daemon 120 is responsible for (1) selectively notifying other broadcast daemons to suspend execution units, and (2) suspending execution of execution units in the node 110 that corresponds to the broadcast daemon 120 when so instructed by another broadcast daemon. The particular functions of broadcast daemon 120 vary from implementation to implementation; the invention is not limited to any of the particular implementation of the broadcast daemon 120.

In one embodiment, when an error occurs, various execution units related to the error are momentarily suspended so that necessary information may be collected for use in identifying causes of the crash. The suspended units are then released, i.e., allowed to continue execution at the points where the units were suspended. The suspended units can be local, i.e., in the error node 110E, or in other nodes 110, or in both the error node 110E and the non-error nodes 110. In various embodiments of the invention, the entire distributed system 100 may be suspended. In one embodiment, the broadcast daemon 120 in the error node 110E notifies the broadcast daemons 120 of the other nodes that have the execution units to be suspended to suspend those units. Those skilled in the art will recognize that a method used to suspend the execution units varies from platform to platform in which the execution units are implemented. The present invention is not limited to any particular platform or any method for suspending the execution units. Any suspension mechanism is effective.

In one embodiment, collecting the data while the execution units are suspended is performed by a process called "dump," which copies raw data from one place to another place with little or no formatting for readability. One embodiment of the invention copies data from main memory to disk. The invention is not limited to the types of data or any method for collecting the data.

IDENTIFYING AN ERROR EVENT

In one embodiment, error events are identified using "assertion checks", or "assertions." Assertions are programming codes usually planted in a program for debugging purposes. In embodiments of the invention, assertions are programmed in such a way that when an assertion is executed an error event is identified. If an error event occurs when an assertion is not being executed, then that error event is classified in a general category as a "system error event." Error events include, for example, segment violation, bus violation, memory violation, etc. Since there are various ways of identifying or classifying an error event, the invention is not limited to how an error event is identified or classified.

IDENTIFYING EXECUTION UNITS TO BE SUSPENDED AND TYPE OF DATA TO BE COLLECTED

Specific execution units that contain state information that may be helpful to the diagnosis of an error vary based on the type of error. Further, the specific state information that is relevant for the diagnosis of an error also varies based on the type of the error and the type of the execution units. Therefore, according to one embodiment, a table is used to indicate, for each error type, (1) the execution units to be suspended, and (2) the type of data to be collected from the suspended execution units.

Figure 2:
FIG. 2 is a table used in one embodiment of the invention.

FIG. 2 shows an exemplary table 200 that shows types of error events, execution units to be suspended, and types of data to be dumped (i.e., collected). For example, for error event 1, execution units P1 and P2 in node 110-1 are to be suspended, and data for process states is to be dumped. For error event 2, execution units P3 and P4 in node 110-3 are to be suspended, and data for system states is to be dumped, and so on. In one embodiment, each table 200 is associated with, and may be included in, a node 110.

METHOD STEPS IN ACCORDANCE WITH ONE EMBODIMENT

Figure 3:
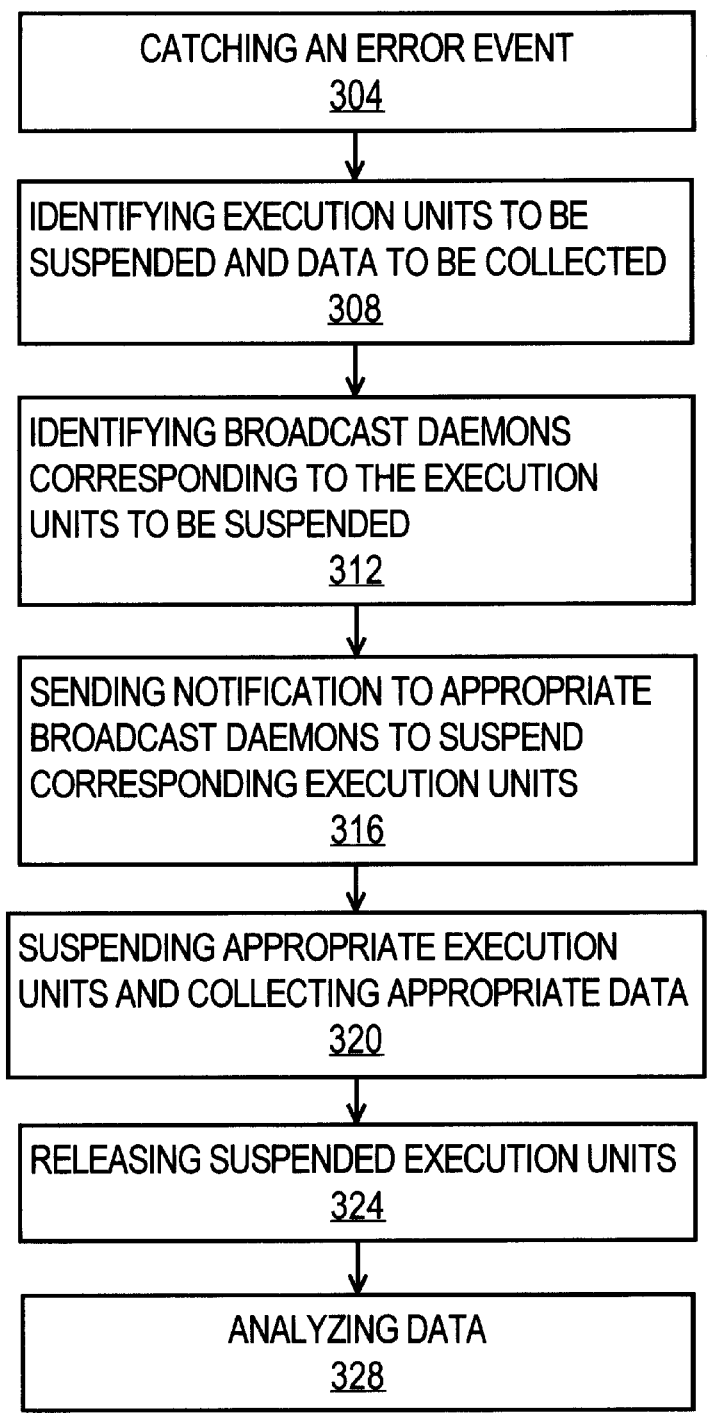
FIG. 3 is a flowchart illustrating how data is preserved and analyzed in accordance with one embodiment.

FIG. 3 is a flowchart illustrating how an embodiment of the invention is implemented in collecting and analyzing data related to a crash.

In step 304, based on assertions as discussed above, an error event in a node 110 is identified.

In step 308, the broadcast daemon 120 of the error node uses a table 200 and the error event to identify a set of execution units to be suspended and a set of data to be collected.

In step 312, broadcast daemon 120 of the error node identifies the broadcast daemons 120 that correspond to the execution units to be suspended.

In step 316, broadcast daemon 120 of the error node sends a notification to broadcast daemons 120 that correspond to the execution units to be suspended. The notification identifies the execution units that need to be suspended, and the specific state information that needs to be gathered from the suspended execution units.

In step 320, the identified execution units are temporarily suspended and the appropriate data is collected.

In step 324, all suspended execution units are allowed to continue execution at the point where they were suspended.

In step 328, data is analyzed to determine the cause of the crash.

The techniques provided herein yield numerous benefits. For example, a window of opportunity is provided to collect useful information from the error node 110E and/or other nodes 110 related to the crash. From this information causes of an error/crash may be determined.

HARDWARE OVERVIEW

Figure 4:
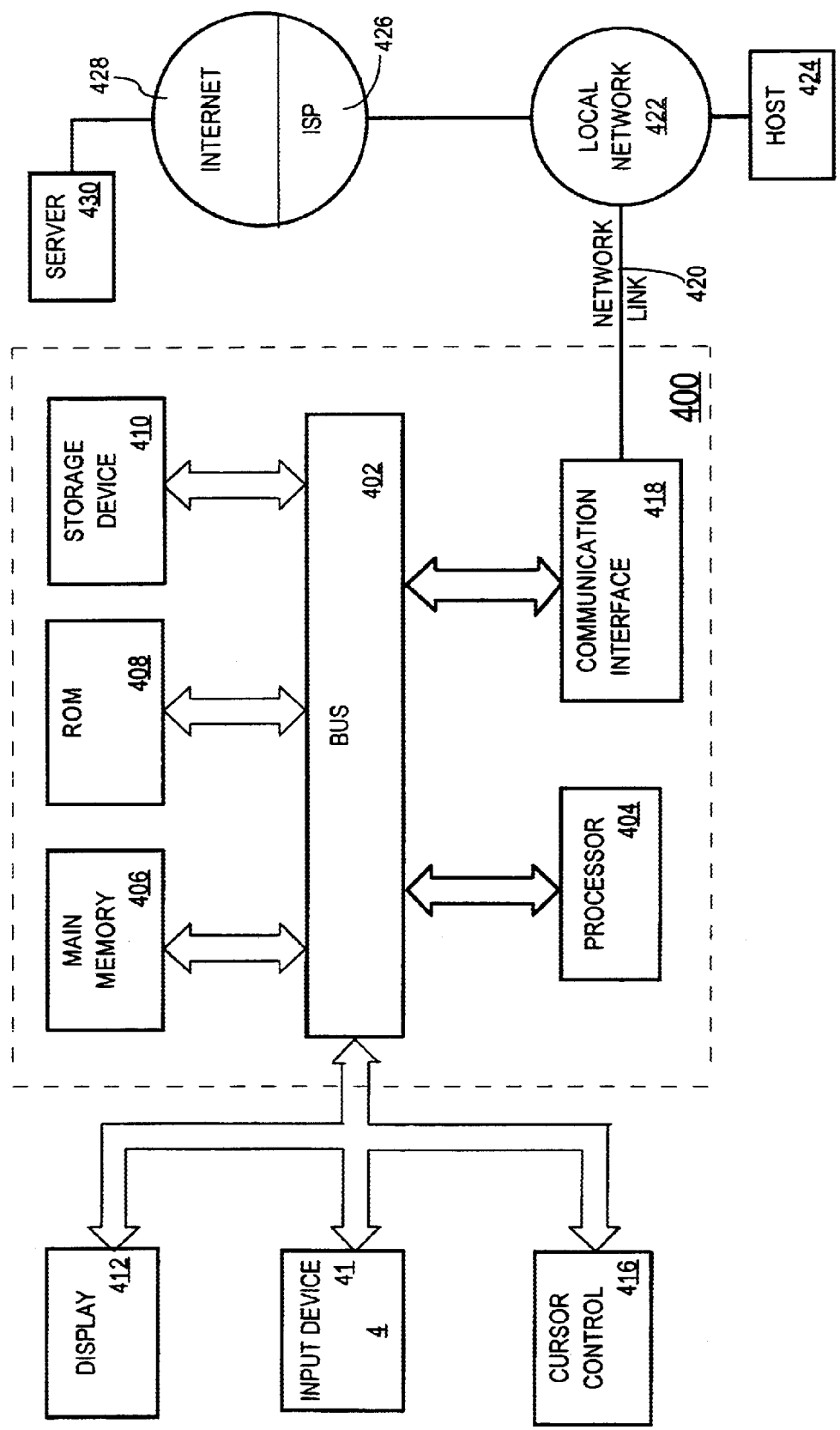
FIG. 4 is a computer system upon which various embodiments of the invention may be implemented.

FIG. 4 is a block diagram that illustrates a computer system 400 upon which an embodiment of the invention may be implemented. In particular, computer system 400 may implement a node 110 running execution units configured to operate as described above. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for identifying causes of an error that occurs during an operation that involves a plurality of nodes, the method comprising the steps of:
    catching an event indicating occurrence of an error in one of the plurality of nodes;
    identifying a set of execution units to be suspended in response to said error, wherein
        an execution unit is at least a portion of an executing program;
    performing the following steps for each execution unit of said set of execution units:
        suspending execution of each execution unit in said set of execution units;
        while said execution unit is suspended, acquiring a set of data that reflects at least part of the state of said execution unit; and
        after acquiring said set of data, allowing said execution unit to continue execution at the point where said execution unit was suspended; and
    providing said set of data for determining a cause of said error.

2. The method of claim 1 wherein the step of identifying a set of execution units is performed based on the type of said event.

3. The method of claim 1 wherein the step of acquiring a set of data is performed based on the type of said event.

4. The method of claim 1 wherein all nodes that are participating in said operation are suspended.

5. The method of claim 1 wherein a node in said plurality of nodes has one or more execution units that are suspended and one or more execution units that are not suspended.

6. The method of claim 1 wherein a table is maintained for storing data that indicates, for each error type of a plurality of error types, a corresponding set of execution units to be suspended.

7. The method of claim 1 wherein a table is maintained for storing data that indicates, for each error type of a plurality of error types, a corresponding set of state information to be collected.

8. The method of claim 1 wherein the step of suspending is performed by broadcast daemons on nodes other than the node on which the error occurred, in response to receiving a notification from a broadcast daemon on the node on which the error occurred.

9. A computer-readable medium bearing instructions to cause a computer to perform the step of identifying causes of an error that occurs during an operation that involves a plurality of nodes; wherein the step of identifying comprises the steps of:

catching an event indicating occurrence of an error in one of the plurality of nodes;

identifying a set of execution units to be suspended in response to said error, wherein an execution unit is at least a portion of an executing program;

performing the following steps for each execution unit of said set of execution units:

suspending execution of each execution unit in said set of execution units;

while said execution unit is suspended, acquiring a set of data that reflects at least part of the state of said execution unit; and after acquiring said set of data, allowing said execution unit to continue execution at the point where said execution unit was suspended; and providing said set of data for determining a cause of said error.

10. The computer-readable medium claim 9 wherein the step of identifying a set of execution units is performed based on the type of said event.

11. The computer-readable medium of claim 9 wherein the step of acquiring a set of data is performed based on the type of said event.

12. The computer-readable medium of claim 9 wherein all nodes that are participating in said operation are suspended.

13. The computer-readable medium of claim 9 wherein a node in said plurality of nodes has one or more execution units that are suspended and one or more execution units that are not suspended.

14. The computer-readable medium of claim 9 wherein a table is maintained for storing data that indicates, for each error type of a plurality of error types, a corresponding set of execution units to be suspended.

15. The computer-readable medium of claim 9 wherein a table is maintained for storing data that indicates, for each error type of a plurality of error types, a corresponding set of state information to be collected.

16. The computer-readable medium of claim 9 wherein the step of suspending is performed by broadcast daemons on nodes other than the node on which the error occurred, in response to receiving a notification from a broadcast daemon on the node on which the error occurred.

17. The method of claim 8 wherein the notification identifies the set of data to be acquired.

18. The computer-readable medium of claim 16 wherein the notification identifies the set of data to be acquired.

19. A method for identifying causes of an error that occurs during an operation that involves a plurality of nodes, the method comprising the steps of:

catching an event indicating occurrence of the error in one of the plurality of nodes;

identifying a set of execution units to be suspended in response to said error, wherein an execution unit is at least a portion of an executing program;

performing the following steps for each execution unit of said set of execution units:

suspending execution of each execution unit in said set of execution units;

while said execution unit is suspended, acquiring a set of data that reflects at least part of the state of said execution unit; and after acquiring said set of data, allowing said execution unit to continue execution at the point where said execution unit was suspended; and maintaining a table for storing data that indicates, for the event indicating occurrence of the error, a corresponding set of execution units to be suspended; and providing said set of data for determining a cause of said error.

20. The method of claim 19, further comprising the step of:

maintaining in the table, for the event, a corresponding set of state information to be collected.

* * * * *